: 2,853,501
Patented Sept. 23, 1958

2,853,501

A-RING HYDROXYALKYLATED ESTRONE AND ESTRADIOL DERIVATIVES

Willard M. Hoehn, Wilmette, and William F. Johns, Morton Grove, Ill., assignors to G. D. Searle & Co., Chicago, Ill., a corporation of Delaware No Drawing. Application November 27, 1957
Serial No. 699,188

6 Claims. (Cl. 260—397.4)

This invention relates to A-ring hydroxyalkylated estrones and estradiols, as also esters and ethers corresponding thereto. More particularly, this invention relates to compounds of the formula

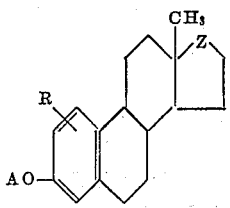

wherein R represents a hydroxyalkyl radical, Z represents a hydroxymethylene or carbonyl radical, and A represents hydrogen or an alkyl or aralkyl radical.

Among the hydroxyalkyl radicals symbolized by R in the foregoing formula, especially groupings wherein OH replaces H in a lower alkyl radical are preferred. Lower alkyl radicals are, of course, such as methyl, ethyl, propyl, isopropyl, butyl, isobutyl, sec-butyl, tert-butyl, pentyl, isopentyl, tert-pentyl, neopentyl, hexyl, isohexyl, heptyl, octyl, and homologous monovalent hydrocarbon aggregates embracive of fewer than nine carbon atoms arranged in chains, either straight or branched. Hydroxymethyl and hydroxyethyl radicals constitute perhaps the commonest embodiments of R in the formula, but it will be appreciated by those skilled in the art that substantially any hydroxy (lower alkyl) grouping is adapted to the specified usage.

As to the meanings assigned to A in the formula, the alkyl radicals contemplated are desirably lower alkyl groupings (of the type set forth in the preceding paragraph), whereas the aralkyl radicals referred to are, for example, benzyl and phenethyl groupings.

Equivalent to the above compounds for the purposes of this invention are esters derived by introduction of an acid residue at one or more of the constituent hydroxyls. Typical of such esters are lower alkanoates, which is to say those esters wherein the acyl radical has the formula

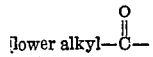

"lower alkyl" being defined as before.

The compounds to which this invention relates are useful because of their valuable pharmacological properties. For example, the subject compositions manifest a capacity to decrease the serum concentration of cholesterol and the corresponding cholesterol/phospholipid ratio without affecting bone density, blood pressure, or other extrauterine indices of physiological activity associated with ring-A-aromatized steroids.

Hydroxymethyl compounds of this invention are manufactured via chloromethylation of estrone methyl ether with formaldehyde and hydrogen chloride in the presence of a catalyst such as zinc chloride, using benzene, chlorobenzene, nitrobenzene, tetrachloroethane, carbon disulfide, or other inert solvent as a reaction medium. This, the so-called Blanc procedure, can be varied by employing, instead of formaldehyde, dimethyl or diethyl formal. Alternatively, both formaldehyde and hydrogen chloride can be replaced with an alkyl chloromethyl or dichloromethyl ether. Aluminum chloride, sulfuric acid, or other catalyst is sometimes substituted for the zinc chloride; indeed, the reaction can be run without any catalyst whatsoever. The chloromethylestrone methyl ether derivatives obtained by the foregoing procedure are, in turn, converted to corresponding hydroxymethyl compounds by, for example, heating in alkanoic acid solution with an alkali alkanoate of the same acid and subsequently hydrolyzing the resultant acetoxy compounds with base. Less desirably, the hydroxy compounds can be directly produced from chloromethylestrones by treatment with aqueous caustic. Interaction, in an inert medium, of the hydroxymethylestrones with a complex metal hydride—illustratively, lithium aluminum hydride—affords the hydroxymethylestrodiols of the invention. Where the free 3-phenol is desired, estrone 3-acetate is substituted for estrone methyl ether as the starting steroid in the reaction sequence outlined.

Other hydroxyalkylestrones and estradiols of the claims can be obtained by the same types of procedures used for the hydroxymethyl compounds, but it is preferred that they be manufactured via Friedel-Crafts acylation of the appropriate estratriene—either estrone or estradiol—with a suitable lower alkanoic acid halide or anhydride, the acylestratrienes thus produced being converted to corresponding carbinols by reduction with alkali borohydride or equivalent complex metal reducing agent. A particularly adapted catalyst for the Friedel-Crafts reaction is anhydrous aluminum chloride; and the reaction is desirably carried out in the presence of benzene, chlorobenzene, nitrobenzene, tetrachloroethane, carbon disulfide, or like solvent. When nitrobenzene or tetrachloroethane is the solvent employed, ether linkages present in the steroid starting material are left substantially intact; otherwise they are in part cleaved to give corresponding phenolic materials.

Ester groupings are introduced into the subject hydroxy compounds by treatment with an acid halide or anhydride of choice, the latter under the influence of a basic catalyst such as pyridine. Etherification is achieved by interaction of a selected steroidal alkoxide and an alkyl or aralkyl halide or sulfate.

The following examples describe in detail certain of the compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), pressures in millimeters (mm.) of mercury, and relative amounts of materials in parts by weight, except as otherwise noted.

Example 1

2 - hydroxymethyl - 3 - methoxyestra - 1,3,5(10)-trien-17-one.—To a solution of 15 parts of estrone methyl ether in 240 parts of s-tetrachloroethane is added 10 parts of aqueous 40% formaldehyde. A stream of anhydrous hydrogen chloride is rapidly bubbled through the resultant solution during vigorous agitation, the solution turning cloudy and slightly brown in process. After 2 hours, an additional 10 parts of aqueous 40% formaldehyde is introduced, followed after a total of 8 hours by 5 volumes of a 1:1 (by volume) mixture of saturated aqueous sodium bicarbonate and aqueous 10% caustic. The solution is straight-way extracted with chloroform, washed thoroughly with water, dried over anhydrous magnesium sulfate, and concentrated to dryness in vacuo. The amorphous residue, which comprises a mixture of chloromethyl-3-methoxyestra-1,3,5(10)-trien-17-ones, is dissolved in a solution of 50 parts of freshly fused sodium acetate in 270 parts of acetic acid. Heated under reflux at the boiling point of the solvent for five hours (during which, after 15 minutes, precipitation of sodium chloride occurs), the solution is next concentrated to 1/10 the original volume under reduced pressure, and then diluted with water and extracted with chloroform. The chloroform extract is thoroughly washed, first with water and then with aqueous sodium bicarbonate, after which it is dried over anhydrous magnesium sulfate. On evaporation of solvent, there remains as a residue a mixture of acetoxymethyl-3-methoxyestra-1,3,5(10)-trien-17-ones which is taken up in a mixture of 160 parts of methanol and 30 parts of potassium carbonate dissolved in 50 parts of water. The resultant solution is heated at the boiling point under reflux for 1 hour, cooled, diluted with water, and finally extracted with chloroform. This extract is washed with water, dried over anhydrous magnesium sulfate, and concentrated to dryness in vacuo. The residue thus obtained is crystallized from acetone to give 2-hydroxymethyl-3-methoxyestra-1,3,5(10)-trien-17-one, the melting point of which is approximately 163–164° C. The product has the formula

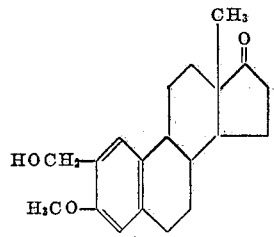

*Example 2*

*4 - hydroxymethyl - 3 - methoxyestra - 1,3,5(10)-trien-17-one.*—Chromatography of the acetone mother liquors accumulated during the work-up of the product of Example 1, using silica gel as adsorbent and mixtures of benzene and ethyl acetate as developing solvents, affords 4 - hydroxymethyl-3-methoxyestra-1,3,5(10)-trien-17-one, the melting point of which is 200–202° C. The product has the formula

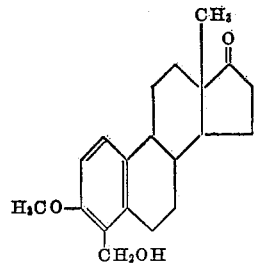

*Example 3*

*3 - hydroxy - 2 - hydroxymethyl - 1,3,5(10) - trien-17-one.*—Using the procedure of Example 1 hereinabove, except that estrone 3-acetate is substituted for estrone methyl ether as the starting steroid, there is obtained 3-hydroxy-2-hydroxymethyl-1,3,5(10)-trien-17-one, of the formula

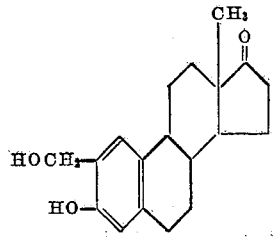

*Example 4*

*2 - hydroxymethyl - 3 - methoxyestra - 1,3,5(10)-trien-17β-ol.*—A solution of 1 part of 2-hydroxymethyl-3-methoxyestra-1,3,5(10)-trien-17-one in 9 parts of tetrahydrofuran is added to 1 part of lithium aluminum hydride dissolved in 55 parts of anhydrous ether. This solution is vigorously agitated at room temperatures for 50 minutes, whereupon ethyl acetate is added to decompose excess hydride, following which an excess of dilute aqueous muriatic acid is introduced. The resultant mixture is extracted with ether and the ether extract washed with water and aqueous sodium bicarbonate. The extract is then dried over anhydrous magnesium sulfate and stripped of solvent by evaporation. Crystallization of the residue from acetone and recrystallization from ethyl acetate affords pure 2-hydroxymethyl-3-methoxyestra-1,3,5(10)-trien-17β-ol, the melting point of which is 198–200° C. The product has the formula

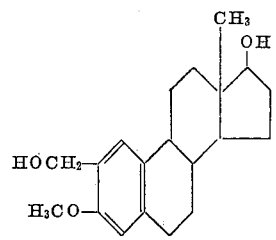

*Example 5*

*4 - hydroxymethyl - 3 - methoxyestra - 1,3,5(10)-trien-17β-ol.*—A solution of 1 part of 4-hydroxymethyl-3-methoxyestra-1,3,5(10)-trien-17-one in 40 parts of anhydrous tetrahydrofuran is added to 1 part of lithium aluminum hydride dissolved in 45 parts of ether. After agitation of the resultant solution at room temperatures during four hours, work-up in accordance with the procedure detailed in Example 4 is effected, except that inasmuch as the desired product is insoluble in acetone and in ethyl acetate, it is crystallized from 2-ethoxyethanol. The 4 - hydroxymethyl - 3-methoxyestra-1,3,5(10)-trien-17β-ol thus obtained melts at 259–263° C. and has the formula

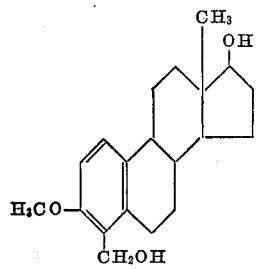

*Example 6*

*2 - (α - hydroxyethyl) - 3 - methoxyestra-1,3,5(10)-trien-17β-ol.*—A solution of 1 part of sodium borohydride in a mixture of 15 parts of ethanol and 5 parts of water is slowly added to a solution of 1 part of 2-acetyl-3-methoxyestra-1,3,5(10)-trien-17-one in approximately 45 parts of a 1:2:4 mixture of benzene, ethyl acetate, and ethanol. As the last of the sodium borohydride solution is introduced, the reaction mixture becomes milky. The mixture is allowed to stand overnight at room temperatures, following which excess reducing agent is destroyed by the addition of an ethanol solution of acetic acid. Approximately 50 parts of water and 90 parts of benzene is next introduced, whereupon the resultant mixture is washed with 200 parts of saturated aqueous brine. The organic layer is separated, again washed with saturated aqueous brine, dried over anhydrous sodium sulfate, and finally stripped of solvent evaporation. The residue is chromatographed on silica gel, using benzene and ethyl acetate as developing solvents. There is obtained by this means 2-(α-hydroxyethyl)-3-methoxyestra-1,3,5(10)-trien-17β-ol, which melts at 134–136° C. and has the formula

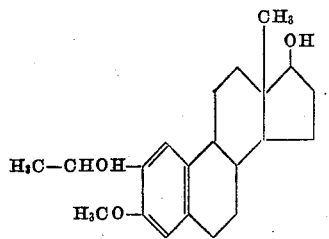

What is claimed is:
1. A compound of the formula

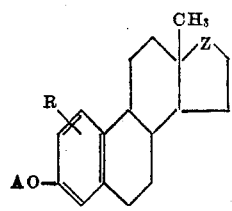

wherein R is a hydroxy(lower alkyl) radical ortho to the oxy linkage in ring A, Z is selected from the group consisting of hydroxymethylene and carbonyl radicals, and A is selected from the group consisting of hydrogen and lower alkyl radicals.

2. 2 - hydroxymethyl - 3 - methoxyestra - 1,3,5(10)-trien-17-one.

3. 4 - hydroxymethyl - 3 - methoxyestra - 1,3,5(10)-trien-17-one.

4. 2 - hydroxymethyl - 3 - methoxyestra - 1,3,5(10)-trien-17β-ol.

5. 4 - hydroxymethyl - 3 - methoxyestra - 1,3,5(10)-trien 17β-ol.

6. 2 - (α - hydroxyethyl) - 3 - methoxyestra-1,3,5(10)-trien-17β-ol.

No references cited.